United States Patent [19]

Kuribayashi

[11] Patent Number: 4,623,914
[45] Date of Patent: Nov. 18, 1986

[54] DISCRIMINATION CIRCUIT FOR A LINE SEQUENTIAL SIGNAL

[75] Inventor: Michio Kuribayashi, Kanagawa, Japan

[73] Assignee: Fuji Photo Film Co., Ltd., Kanagawa, Japan

[21] Appl. No.: 660,325

[22] Filed: Oct. 12, 1984

[30] Foreign Application Priority Data

Oct. 15, 1983 [JP] Japan ................. 58-192941
Dec. 22, 1983 [JP] Japan ................. 58-241065

[51] Int. Cl.[4] ........................................... H04N 11/18
[52] U.S. Cl. ................................. 358/14; 358/18
[58] Field of Search ............... 358/14, 18, 310, 23, 358/24, 40

[56] References Cited

U.S. PATENT DOCUMENTS

| 4,072,983 | 2/1978 | Aschwander | 358/18 X |
| 4,145,711 | 3/1979 | Aschwander | 358/14 |
| 4,191,965 | 3/1980 | Nelson | 358/14 X |
| 4,240,102 | 12/1980 | Groeneweg | 358/11 |
| 4,357,623 | 11/1982 | Hinn | 358/18 |
| 4,574,301 | 3/1986 | Sachs | 358/18 |

FOREIGN PATENT DOCUMENTS 2428364 2/1980 France ................. 358/23

Primary Examiner—James J. Groody
Assistant Examiner—Michael P. Dunnam

[57] ABSTRACT

An identification signal is produced on the basis of the difference between the potentials in the adjacent horizontal blanking periods of a demodulated line sequential color signal. Therefore, a delay, if, of the discrimination timing can be substantially ignored when compared to the system using narrow-bandpass filters, and the color signals can be accurately discriminated without delay. Further, by the virtue of the provision of the horizontal scanning period rate conversion circuit, a pulse which is synchronous with the horizontal signal and appears accurately at the time interval of one horizontal scanning period is based on for effecting the accurately desired discrimination, so that the discrimination can be reliably effected at the desired position without an adverse effect of noise, a dropout in magnetic recoding or the like.

9 Claims, 50 Drawing Figures

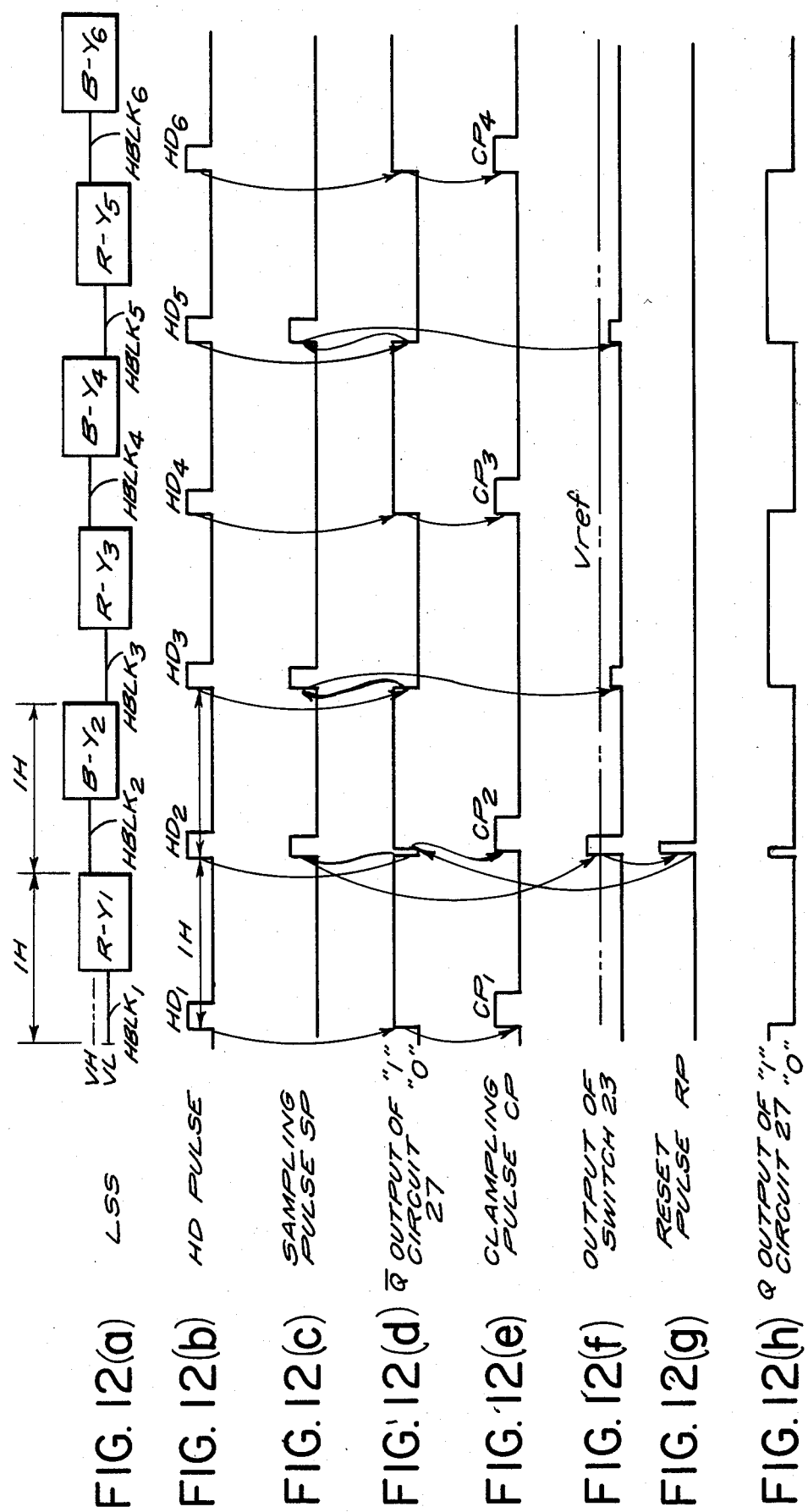

FIG. 14(a) LSS 
FIG. 14(b) Q̄ OUTPUT OF CIRCUIT 52 
FIG. 14(c) SAMPLING PULSE SPa 
FIG. 14(d) SAMPLING PULSE SPb 
FIG. 14(e) OUTPUT OF GATE 56 
FIG. 15(a) LSS 
FIG. 15(b) Q̄ OUTPUT OF CIRCUIT 52 
FIG. 15(c) SAMPLING PULSE SPa 
FIG. 15(d) SAMPLING PULSE SPb 
FIG. 15(e) OUTPUT OF GATE 56 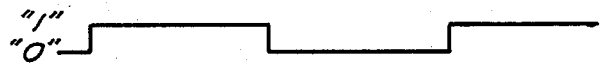

DISCRIMINATION CIRCUIT FOR A LINE SEQUENTIAL SIGNAL

BACKGROUND OF THE INVENTION (1) Field of the Invention

This invention relates to a line-sequential color signal discrimination circuit which, when two kinds of color signals are alternately selected every other horizontal scanning period to constitute a single signal or a so-called line sequential color signal, discriminates as to which one of the two kinds of color signals is selected in each of the horizontal scanning periods. More particularly, the present invention relates to a discrimination circuit of the kind above described which, when applied to, for example, a recording and reproducing system, recording a color video signal on a recording medium in a line sequential fashion and then reproducing the recorded signal from the recording medium, is useful for discriminating as to whether the signal reproduced in each of the horizontal scanning periods is which one of the two kinds of color signals, for example, the color difference signals R-Y and B-Y.

(2) Description of the Prior Art

In countries including France, a line sequential television system called the SECAM system is a standard television system. According to this SECAM system, two color difference signals B-Y and R-Y are alternately switched over every other horizontal scanning period and are used for frequency modulation of two subcarriers having slightly different frequencies respectively, and a luminance signal is superposed on said frequency-modulated color signals to constitute a carrier video signal. In a demodulation system demodulating said carrier video signal, the color signal delayed by one horizontal scanning period and the color signal not subjected to the delay are derived in parallel relation, so that the color difference signals R-Y and B-Y dropped out at the time interval of one horizontal scanning period at the time of modulation are complemented by the color difference signals R-Y and B-Y demodulated in the preceding horizontal scanning periods to obtain the two independent and continuous color difference signals R-Y and B-Y. For this purpose, the demodulation system includes a switch for alternately deriving the color signal delayed by one horizontal scanning period and the color signal not subjected to the delay. Deriving the two kinds of color signals in parallel relation as described above is called the simultaneity, and the switch provided for that purpose is called a simultaneity switch.

The simultaneity switch used in the SECAM system is changed over in a manner as will be described presently. That is, the two color difference signals R-Y and B-Y alternately changed over every other horizontal scanning period to constitute the line sequential color signal are used for modulating subcarriers having respectively different frequencies, and, in the demodulation system, an identification signal discriminating between the color difference signals R-Y and B-Y on the basis of the frequency difference is produced to change over the simultaneity switch.

For the generation of such an identification signal on the basis of the frequency difference between the subcarriers, it has been a common practice that the burst signal of the color signal is passed in parallel relation through two narrow-bandpass filters having different passbands, and the outputs of these filters are compared to produce the identification signal. In this case, the passband of each of the bandpass filters must be as narrow as possible in order that the subcarriers can be accurately derived without being affected by noise and the like and in a relation distinctly separated from each other. However, narrowing of the passband of each of the filters results in a great delay of the filter output, and the problem arises in which the switching timing of the simultaneity switch is delayed, and one of the color difference signals is sequentially included in the other color difference signal. Such a problem occurs not only in the SECAM television system but also occurs naturally in a system including the steps of arranging two color difference signals in a line sequential fashion, frequency-modulating two subcarriers having a slight frequency difference by the two color difference signals respectively, combining these two FM signals into an FM line sequential color signal, recording this FM line sequential color signal together with an FM luminance signal, obtained by frequency modulation of a main carrier by a luminance signal, on a recording medium in a frequency division multiplex (FDM) mode, and then reproducing the recorded composite video signal.

SUMMARY OF THE INVENTION

It is an object of the present invention to provide a line-sequential color signal discrimination circuit which obviates the prior art problem of the delayed switching time due to the filtering above described and which minimizes an undesirable delay of the discrimination timing.

Another object of the present invention is to provide a line-sequential color signal discrimination circuit which can discriminate between the two kinds of color signals even if the apparent period of the horizontal synchronizing signal might deviate from the predetermined one due to appearance of a false horizontal synchronizing signal attributable to noise or the like or due to dropout of the horizontal synchronizing signal.

In accordance with a first aspect of the present invention which attains the above objects, there is provided a line-sequential color signal discrimination circuit which receives as its input signal a line sequential color signal provided by alternately selecting two kinds of color signals at a time interval of one horizontal scanning period to arrange the color signals in a line sequential fashion and modulated in such a relation that the two kinds of the color signals have respectively different potentials in the adjacent horizontal blanking periods after demodulation and which generates as its output signal an identification signal discriminating between the two kinds of the color signals, said discrimination circuit comprising: a frequency divider circuit receiving as its input signal a pulse signal including HD pulses applied at a time interval of one horizontal scanning period and dividing the frequency of said HD pulse signal by the factor of 2, said frequency divider circuit having a reset terminal; a clamping pulse generating circuit triggered in synchronous relation with the timing of the rise time or fall time of the output signal of said frequency divider circuit thereby generating a clamping pulse signal including pulses selectively appearing in the horizontal blanking periods; a clamping circuit clamping the demodulated line sequential color signal at a predetermined potential; a sampling circuit sampling the clamped and demodulated line sequential color signal in at least the horizontal blanking period immediately after the signal clamping horizontal blanking period among the individual horizontal blanking periods; and a reset pulse generating circuit comparing each of succesively sampled values with a reference value and generating a reset pulse resetting the frequency divider circuit when a predetermined condition of whether the sampled value is larger or smaller than the reference value is satisfied, whereby said identification signal is generated from said frequency divider circuit.

In accordance with a second aspect of the present invention, there is provided a line-sequential color signal discrimination circuit which receives as its input signal a line sequential color signal provided by alternately selecting two kinds of color signals at a time interval of one horizontal scanning period to arrange the color signals in a line sequential fashion and modulated in such a relation that the two kinds of the color signals have respectively different potentials in the adjacent horizontal blanking periods after demodulation and which generates as its output signal an identification signal discriminating between the two kinds of the color signals, said discrimination circuit comprising: two sample-hold circuits receiving the demodulated line sequential color signal as their input signals; a comparator circuit comparing the relative levels of the output signals of said two sample-hold circuits with each other; a frequency divider circuit receiving as its input signal a pulse signal including HD pulses applied at a time interval of one horizontal scanning period and dividing the frequency of said HD pulse signal by the factor of 2; a first sampling pulse generating circuit triggered in synchronous relation with the timing of the rise time or fall time of the output signal of said frequency divider circuit thereby generating a sampling pulse actuating one of said sample-hold circuits in the horizontal blanking periods; a second sampling pulse generating circuit triggered in synchronous relation with the timing at which said first sampling pulse generating circuit, triggered at the timing of the rise time or fall time of the output signal of said frequency divider circuit, is not triggered thereby generating a sampling pulse actuating the other of said sample-hold circuits in the horizontal blanking period; and an Ex-OR gate generating said identification signal in response to the application of the output signal of said frequency divider circuit and the output signal of said comparator circuit.

In accordance with a third aspect of the present invention, there is provided a line-sequential color signal discrimination circuit which receives as its input signal a line sequential color signal provided by alternately selecting two kinds of color signals at a time interval of one horizontal scanning period to arrange the color signals in a line sequential fashion and modulated in such a relation that the two kinds of the color signals have respectively different potentials in the adjacent horizontal blanking periods after demodulation and which generates as its output signal an identification signal discriminating between the two kinds of the color signals, said discrimination circuit comprising: a horizontal synchronizing signal separating circuit separating the horizontal synchronizing signal from a composite video signal; a horizontal scanning period rate conversion circuit extracting a pulse signal including pulses appearing at a time interval of one horizontal scanning period in response to the application of the output pulse signal from said synchronizing signal separating circuit; a frequency divider circuit dividing the frequency of the output pulse signal of said horizontal scanning period rate conversion circuit by the factor of 2; and an identification pulse generating circuit generating an identification pulse signal in which the information for discrimination based on the potentials of the two kinds of the color signals in the demodulated line sequential color signal in the horizontal blanking periods has a predetermined relation with the output signal of said frequency divider circuit.

In accordance with a fourth aspect of the present invention, there is provided a line-sequential color signal discrimination circuit which receives as its input signal a line sequential color signal provided by alternately selecting two kinds of color signals at a time interval of one horizontal scanning period to arrange the color signals in a line sequential fashion and modulated in such a relation that the two kinds of the color signals have respectively different potentials in the adjacent horizontal blanking periods after demodulation and which generates as its output signal an identification signal discriminating between the two kinds of the color signals, said discrimination circuit comprising: a synchronizing signal separating circuit separating the horizontal synchronizing signal from a composite video signal; a horizontal scanning period rate conversion circuit extracting a pulse signal including pulses appearing at a time interval of one horizontal scanning period in response to the application of the output pulse signal from said synchronizing signal separating circuit; a frequency divider circuit dividing the frequency of the output pulse signal of said horizontal scanning period rate conversion circuit by the factor of 2 and having a reset terminal; a clamping pulse generating circuit triggered in synchronous relation with the timing of the rise time or fall time of the output signal of said frequency divider circuit thereby generating a clamping pulse signal including pulses selectively appearing in the horizontal blanking periods; a clamping circuit clamping the demodulated line sequential color signal at a predetermined potential; a sampling circuit sampling the clamped line sequential color signal in at least the horizontal blanking period immediately after the signal-clamping horizontal blanking period among the individual horizontal blanking periods; and a reset pulse generating circuit comparing each of successively sampled values with a reference value and generating a reset pulse resetting said frequency divider circuit when a predetermined condition of whether the sampled value is larger or smaller than the reference value is satisfied, whereby said identification signal is generated from the frequency divider circuit.

In accordance with a fifth aspect of the present invention, there is provided a line-sequential color signal discrimination circuit which receives as its input signal a line sequential color signal provided by alternately selecting two kinds of color signals at a time interval of one horizontal scanning period to arrange the color signals in a line sequential fashion and modulated in such a relation that the two kinds of the color signals have respectively different potentials in the adjacent horizontal blanking periods after demodulation and which generates as its output signal an identification signal discriminating between the two kinds of the color signals, said discrimination circuit comprising: two sample-hold circuits receiving the demodulated line sequential color signal as their input signals; a comparator circuit comparing the relative levels of the output signals of said two sample-hold circuits with each other; a synchronizing signal separating circuit separating the horizontal synchronizing signal from a composite video signal; a horizontal scanning period rate conversion circuit extracting a pulse signal including pulses appearing at a time interval of one horizontal scanning period in response to the application of the output signal from said synchronizing signal separating circuit; a first sampling pulse generating circuit triggered in synchronous relation with the timing of the rise time or fall time of the output signal of said frequency divider circuit thereby generating a pulse actuating one of said sample-hold circuits in the horizontal blanking periods; a second sampling pulse generating circuit triggered in synchronous relation with the timing at which said first sampling pulse generating circuit, triggered at the timing of the rise time or fall time of the output signal of said frequency divider circuit, is not triggered thereby generating a sampling pulse actuating the other of said sample-hold circuits in the horizontal blanking period; and an Ex-OR gate generating said identification signal in response to the application of the output signal of said frequency divider circuit and the output signal of said comparator circuit.

It will be seen from the construction of various embodiments of the discrimination circuit of the present invention described above that the present invention is applicable to a system in which two kinds of color signals in a demodulated line sequential color signal have respectively different potentials in the adjacent horizontal blanking periods, and that the method of modulation may be either the frequency modulation (FM) or the pulse modulation (PM). Further, the two kinds of color signals are in no way limited to the color difference signals R-Y and B-Y. Furthermore, the present invention is applicable not only to television systems but also to various other recording systems including VTR and rotary disk apparatus.

In the present invention, the identification signal is produced on the basis of the difference between the potentials of a demodulated line sequential color signal in the adjacent horizontal blanking periods. Therefore, a delay, if any, of the timing of discrimination is almost negligible when compared with the SECAM system using narrow-bandpass filters.

Furthermore, in the present invention, as HD pulse signal obtained from the combination of a synchronizing signal separating circuit and a horizontal scanning period rate conversion circuit is applied to the frequency divider circuit. Therefore, the color signals can be reliably discriminated even when the period of the horizontal synchronizing signal may apparently deviate from the normal one due to noise or the like.

BRIEF DESCRIPTION OF THE DRAWINGS

FIGS. 12(a) to 12(h) show operating waveforms appearing at various parts of the embodiment shown in FIG. 11.

FIGS. 14(a) to 14(e) and FIGS. 15(a) to 15(e) show operating waveforms appearing at various parts of the embodiment shown in FIG. 13.

Figure 1:
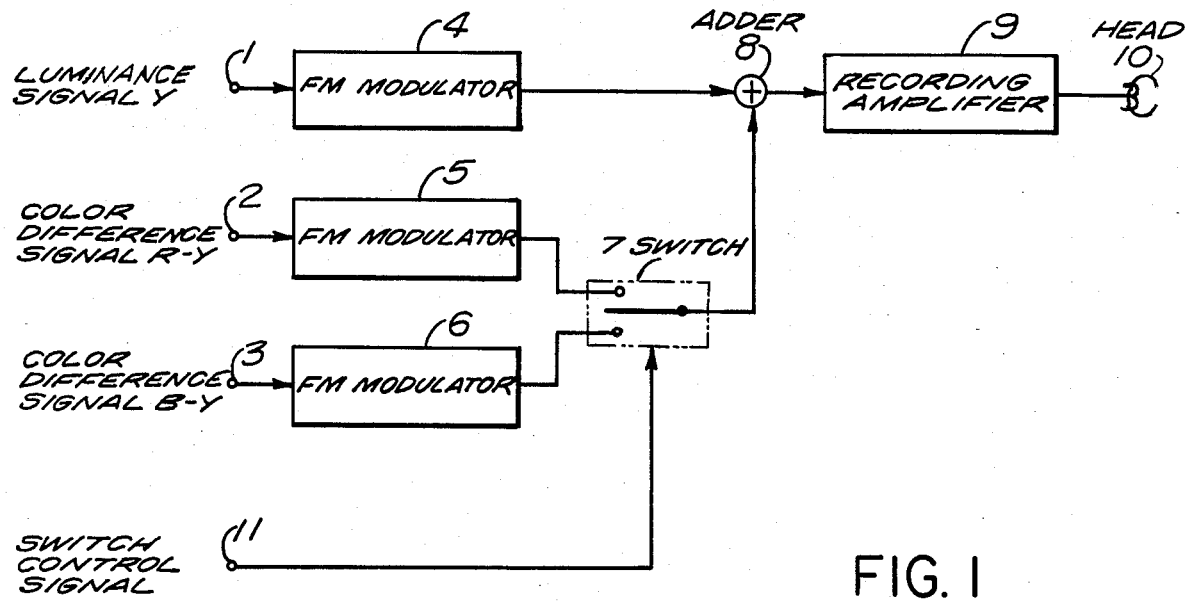
FIG. 1 is a simplified block diagram showing the structure of a magnetic recording system according to one form of a line sequential method.

In the drawings, the following reference numerals are used to designate various circuits and elements respectively:

22: Clamping circuit
23: Sampling switch
25: Reset pulse generating circuit
27: Frequency divider circuit with reset terminal
30: Clamping pulse generating circuit
31: Differential amplifier
32: Switch
33: Constant current source
35: Comparator
49: Sampling pulse generating circuit
50, 51: Sample-hold circuit
52: Frequency divider circuit
53, 54: Sampling pulse generating circuit
55: Comparator
56: Ex-OR gate
58: Synchronizing signal separating circuit
59: Horizontal scanning period rate conversion circuit (H-rate conversion circuit)

DETAILED DESCRIPTION OF THE PREFERRED EMBODIMENTS

Figure 2:
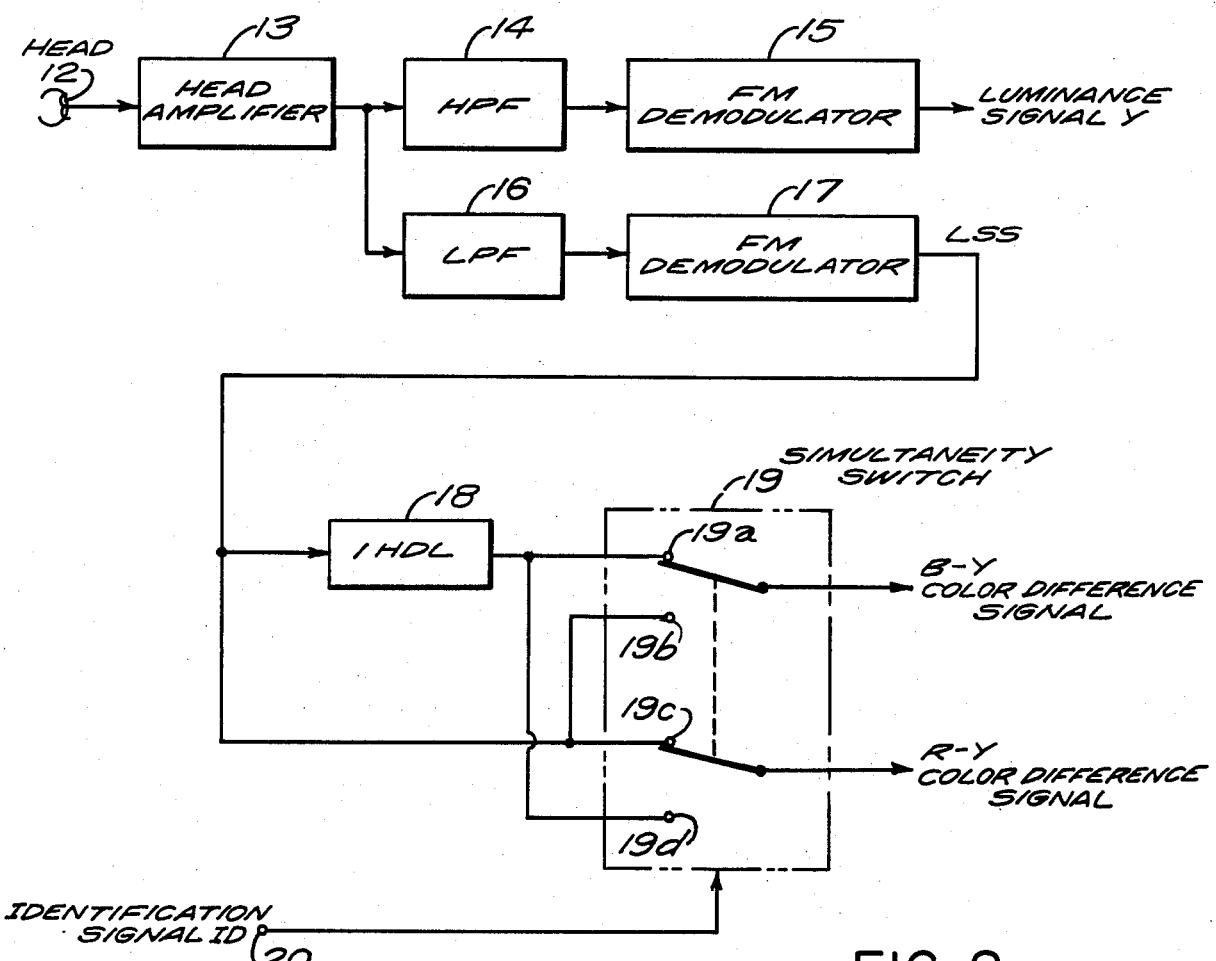
FIG. 2 is a simplified block diagram showing the structure of a reproducing system associated with the recording system shown in FIG. 1.

The present invention will now be described in detail with reference to the drawings. For a better understanding of the present invention, a simplified structure of a magnetic recording system according to one form of a line sequential method is shown in FIG. 1 for reference, a simplified structure of a reproducing system associated with the recording system is shown in FIG. 2 for reference, and the operation of the simultaneity switch shown in FIG. 2 is shown together with associated signals in FIG. 3 for reference. FIGS. 1, 2 and 3 will be briefly described before describing the present invention in detail.

Referring to FIG. 1 illustrating a magnetic recording system by way of example, the magnetic recording system includes an input terminal 1 of a luminance signal Y, an input terminal 2 of one of two color signals, for example, a color difference signal R-Y, an input terminal 3 of the other color signal, for example, a color difference signal B-Y, an FM modulator 4 using a main carrier having a frequency of about 7 MHz, another FM modulator 5 using a sub-carrier having a frequency of 1.2 MHz, another FM modulator 6 using a sub-carrier having a frequency of 1.3 MHz, a line sequential switch 7, an adder circuit 8, a recording amplifier 9, a recording head 10, and an input terminal 11 of a switch control signal. The switch control signal is an on-off signal which is produced on the basis of, for example, a horizontal drive signal (or a so-called HD pulse) appearing at the start point of each horizontal scanning period (1H) and which rises to its high level and falls to its low level at a time interval of 1H. Thus, the switch control signal is a ½ fH signal, where fH is the horizontal scanning frequency.

Referring to FIG. 2, the reproducing system includes a reproducing head 12, a head amplifier 13, a high-pass filter 14 for separating an FM luminance signal, an FM demodulator 15, a low-pass filter 16 for separating an FM line sequential color difference signal, another FM demodulator 17, a 1H delay line 18, a simultaneity switch 19, and an input terminal 20 of an identification signal ID.

Figure 3A:
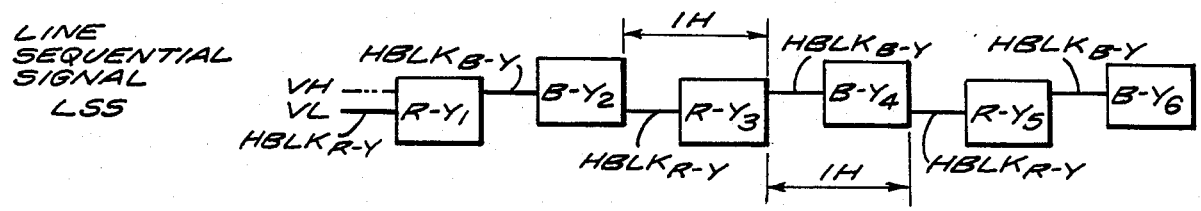
FIGS. 3(a) to 3(d) show operating waveforms appearing at various parts of the reproducing system shown in FIG. 2.
Figure 3B:
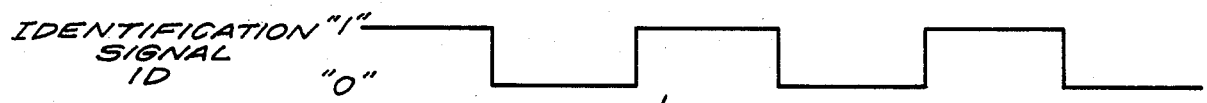
Figure 3C:
Figure 3D:

Suppose now that the color difference signals R-Y and B-Y in the demodulated line sequential color difference signal LSS are repeated in the order shown in FIG. 3(a), and the potential VH of the color difference signal B-Y in the horizontal blanking period $HBLK_{B-Y}$ is higher than the potential $V_L$ of the color difference signal R-Y in the horizontal blanking period $HBLK_{R-Y}$. Suppose further that the level of the identification signal ID changes in a relation corresponding to the repeated color difference signals R-Y and B-Y, that is, between "1" and "0" as, for example, shown in FIG. 3(b). Then, when contacts 19a, 19b, 19c and 19d of the simultaneity switch 19 are turned on-off in relation to the "1" and "0" levels of the identification signal ID as shown in FIGS. 3(c) and 3(d), the line sequential color difference signal LSS is separated into the discrete continuous color difference signals R-Y and B-Y. It is apparent that the level change points of the identification signal ID are the same as those in the record mode.

A preferred embodiment of the line-sequential color signal discrimination circuit according to the present invention will be described with reference to FIG. 4.

Figure 4:
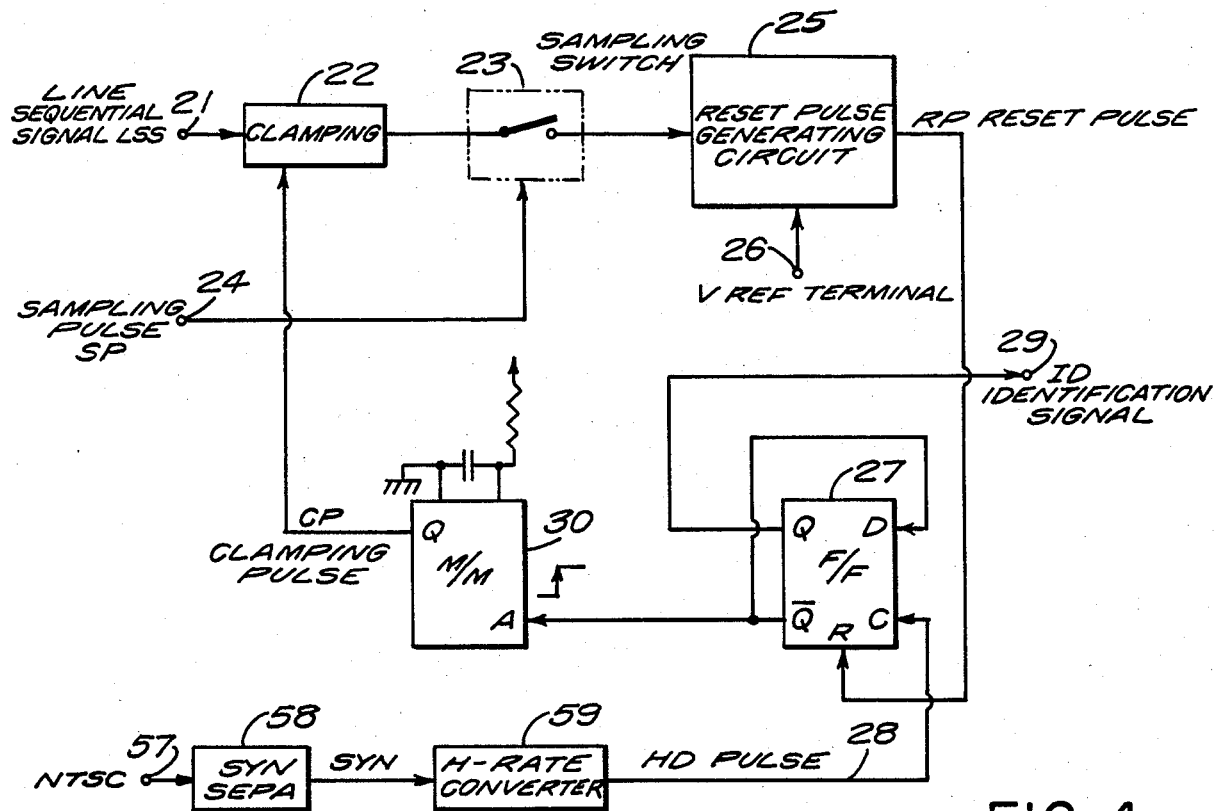
FIG. 4 is a block circuit diagram showing the structure of an embodiment of the discrimination circuit according to the present invention.

Referring to FIG. 4, the discrimination circuit includes an input terminal 21 of a demodulated line sequential color difference signal LSS, a clamping circuit 22, a sampling switch 23, an input terminal 24 of a sampling pulse signal SP, a reset pulse generating circuit 25, and a terminal 26 of a reference voltage Vref. Pulses, for example, HD pulses 28 are applied at a time interval of 1H to a frequency divider circuit 27 which is in the form of a flip-flop circuit F/F. An identification signal ID appears at an output terminal 29, and a clamping pulse generating circuit 30 is in the form of a monostable multivibrator M/M.

Figure 5:
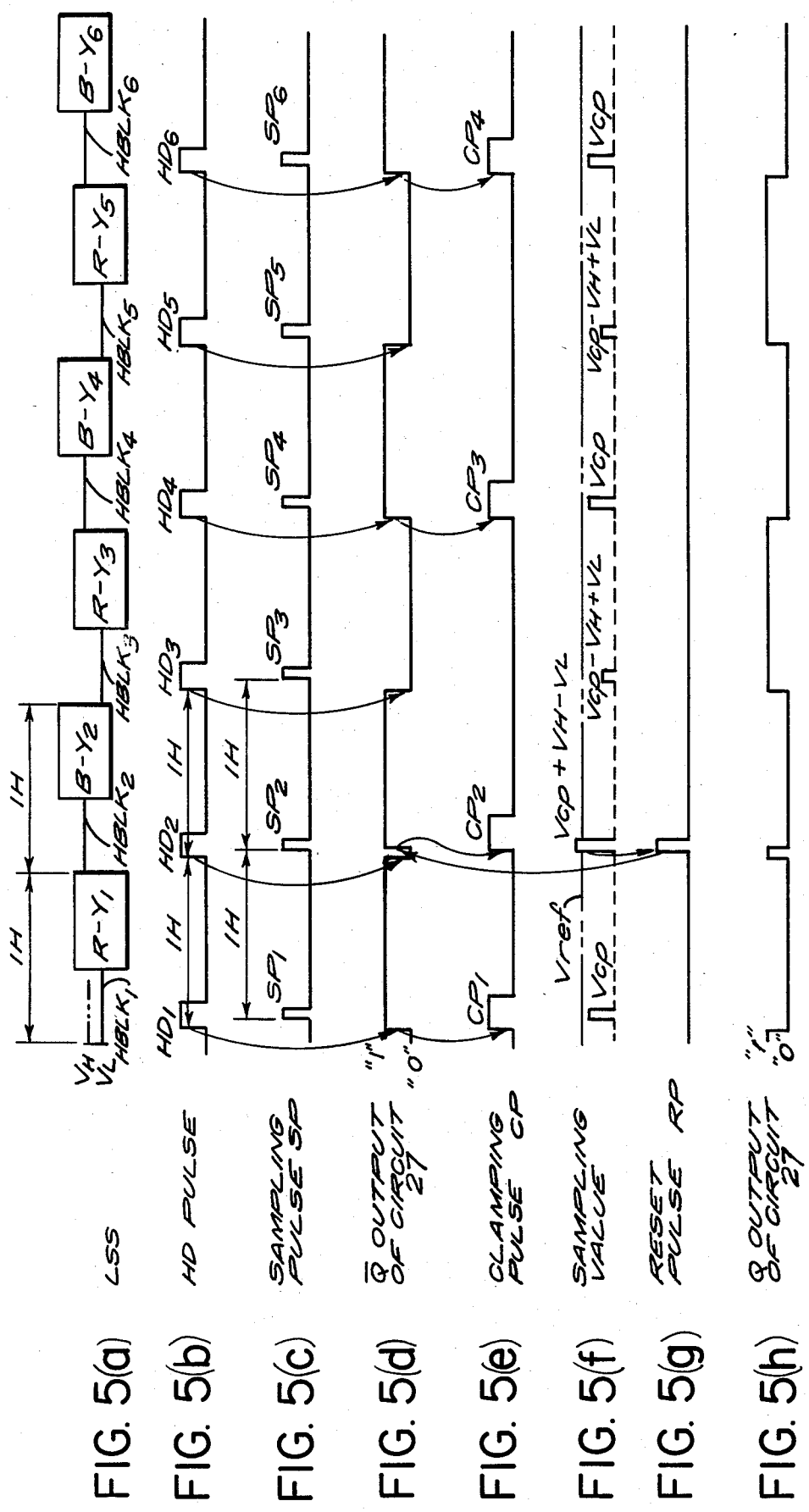
FIGS. 5(a) to 5(h) show operating waveforms appearing at various parts of the embodiment shown in FIG. 4.

The operation of the line-sequential color signal discrimination circuit shown in FIG. 4 will now be described. Suppose now that the demodulated line sequential color difference signal LSS applied to the clamping circuit 22 starts from the color difference signal R-Y as shown in FIG. 5(a), and the potential $V_H$ of the color difference signal B-Y in the horizontal blanking period is higher than the potential $V_L$ of the color difference signal R-Y in the horizontal blanking period as also shown in FIG. 5(a). Suppose further that an HD pulse 28 appearing in each of the horizontal blanking periods is applied to the frequency divider circuit 27 as shown in FIG. 5(b). Suppose further that, in response to the application of the first color difference signal R-Y$_1$ and the first HD pulse HD$_1$, the output appearing at the terminal $\overline{Q}$ of the frequency divider circuit 27 rises to its "1" level as shown in FIG. 5(d), and this $\overline{Q}$ output triggers the clamping pulse generating circuit 30. Then, by suitably selecting the time constant, a clamping pulse CP$_1$ as shown in FIG. 5(e) appears from the terminal Q of the clamping pulse generating circuit 30 in the first horizontal blanking period HBLK$_1$. Consequently, the potential in the first horizontal blanking period HBLK$_1$ is necessarily set at a clamped potential Vcp. On the other hand, sampling pulses SP are applied at a time interval of 1H as shown in FIG. 5(c). The potential level sampled by application of the first sampling pulse SP$_1$ is the clamped potential Vcp as shown in FIG. 5(f). It is supposed for the sake of simplicity that the reset pulse generating circuit 25 generates a reset pulse RP by directly comparing its input voltage with the reference voltage Vref. For example, the reset pulse generating circuit 25 is designed to generate a reset pulse RP only when the following relation holds:

$$\text{Vref} < \text{input voltage} \qquad (1)$$

Therefore, when the clamped potential Vcp is so set as to satisfy the relation $$\text{Vcp} < \text{Vref} \qquad (2),$$

no reset pulse RP is generated in the case of the first sampling. Consequently, even when a second HD pulse HD$_2$ is applied to the frequency divider circuit 27, the $\overline{Q}$ output falls merely to its low level, and no clamping pulse is generated.

In the next horizontal blanking period HBLK$_2$, the potential $V_H$ of the color difference signal B-Y$_2$ is higher than the potential Vcp clamped in the first horizontal blanking period HBLK$_1$, due to the fact that the potential $V_H$ of the color difference signal B-Y in the horizontal blanking period is higher than the potential $V_L$ of the color difference signal R-Y in the horizontal blanking period as described already, and that the potential $V_L$ of the first color difference signal R-Y$_1$ is clamped at the potential Vcp in the first horizontal blanking period HBLK$_1$. The level sampled by application of a second sampling pulse SP$_2$ is [Vcp+($V_H - V_L$)]. Thus, when the reference voltage Vref applied to the reset pulse generating circuit 25 is so set as to satisfy the relation $$\text{Vref} < \text{Vcp} + V_H - V_L \qquad (3),$$

a reset pulse RP as shown in FIG. 5(g) is generated when the sampling switch 23 is turned on. In response to the application of the reset pulse RP to the reset terminal R of the frequency divider circuit 27, the $\overline{Q}$ output of the frequency divider circuit 27 rises to its "high" level. Consequently, a second clamping pulse CP$_2$ appears to clamp the potential in the second horizontal blanking period HBLK$_2$.

Even when a third HD pulse HD$_3$ is then applied to the frequency divider circuit 27, the $\overline{Q}$ output falls merely to its "low" level, and no clamping pulse for clamping the potential in the third horizontal blanking period HBLK$_3$ is generated. However, since the potential in the second horizontal blanking period HBLK$_2$ has been clamped to Vcp, the level sampled by application of a third sampling pulse SP$_3$ is [Vcp−(V$_H$−V$_L$)]. From the relation V$_H$>V$_L$ and also from the expression (2), the following relation holds:

$$Vcp - V_H + V_L < Vref \tag{4}$$

In this case, no reset pulse RP is generated. Then, in response to the application of a fourth HD pulse HD$_4$ to the frequency divider circuit 27, its $\overline{Q}$ output rises to its "high" level, and a third clamping pulse CP$_3$ is produced thereby clamping the potential of the color difference signal B-Y$_4$ in the fourth horizontal blanking period HBLK$_4$. In such a case, the relation Vcp<Vref holds, and no reset pulse RP is generated, even when the sampling switch 23 is turned on to apply the clamped potential Vcp to the reset pulse generating circuit 25.

Thereafter, the operation similar to that described above is repeated, so that complete correspondence between the kind of the color difference signal and the level of the $\overline{Q}$ output of the frequency divider circuit 27 is attained after the application of the color difference signal B-Y$_2$. The Q output of the frequency divider circuit 27, as shown in FIG. 5(h), is applied to the identification signal input terminal 20 shown in FIG. 2. Accordingly, even when the relation between the kind of the color difference signal and the level of the $\overline{Q}$ output of the frequency divider circuit 27 may not show the complete correspondence when the first color difference signal is applied, and the level of the output of the frequency divider circuit 27 may be either "1" or "0", an identification signal ID corresponding to the line sequential color difference signal as shown in FIG. 3(b) can be obtained after the second horizontal blanking period HBLK$_2$. Also, even when a dropout may occur in the course of the continuous steps of discrimination, the identification signal ID corresponds accurately to the line sequential color difference signal after the period of 2H counted from the time of end of the dropout.

In the afore mentioned embodiment of the present invention, the HD pulse signal is provided by, for example, passing a composite video signal NTSC, which is a standard signal in the NTSC system, through a synchronizing signal separating circuit 58 and then through a horizontal scanning period rate conversion circuit (referred to hereinafter as an H-rate conversion circuit) 59. The synchronizing signal separating circuit 58 separates the horizontal synchronizing signal SYN from the composite video signal NTSC. The H-rate conversion circuit 59 extracts pulses appearing at a time interval of 1H, that is, HD pulses so called in the embodiment in response to the application of the output pulse signal from the synchronizing signal separating circuit 58. Describing in more detail, the H-rate conversion circuit 59 includes the combination of a flip-flop circuit 59a and a one-shot multivibrator 59b as, for example, shown in FIG. 6.

Figure 6:
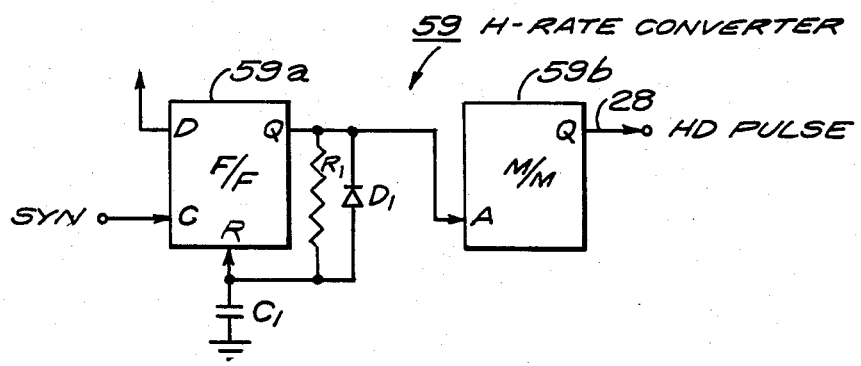
FIG. 6 is a block circuit diagram showing the structure of the H-rate conversion circuit shown in FIG. 4.
Figure 7A:
FIGS. 7(a) to 7(d) show operating waveforms appearing at various parts of the circuit shown in FIG. 6.
Figure 7B:
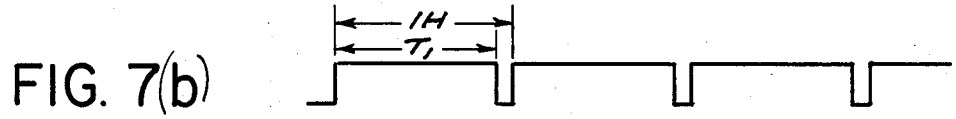
Figure 7C:
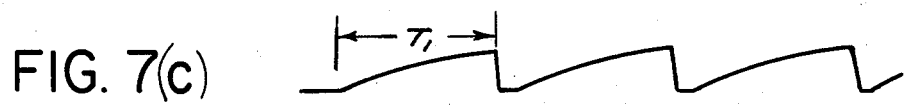
Figure 7D:

FIGS. 7(a) to 7(d) show operating waveforms appearing at various parts of the H-rate conversion circuit 59 shown in FIG. 6. The operation of the H-rate conversion circuit 59 will be described with reference to FIGS. 7(a) to 7(d). The horizontal synchronizing signal SYN, which is the output pulse signal of the synchronizing signal separating circuit 58, as shown in FIG. 7(a), is applied to the input terminal C of the hlip-flop circuit 59a. In response to the application of the signal SYN, an output of "high" level as shown in FIG. 7(b) appears at the output terminal Q of the flip-flop circuit 59a. On the other hand, since the reset terminal R is connected to output terminal Q through a resistor R$_1$, the voltage at the reset terminal R increases gradually until it attains the reset voltage level after lapse of a predetermined time setting T$_1$ determined by the time constant of the combination of the resistor R$_1$ and a capacitor C$_1$, as shown in FIG. 7(c). At this time, the flip-flop circuit 59a is reset, and an output of "low" level appears at the output terminal Q. At the same time, the capacitor C$_1$ discharges through a diode D$_1$, and the reset terminal R is restored to its original state.

Thereafter, the operation similar to that described above is repeated each time the horizontal synchronizing signal SYN is applied to the input terminal C of the flip-flop circuit 59a. In the course of the above operation, the output pulse signal of the synchronizing signal separating circuit 58 may include a noise pulse P$_1$ between the synchronizing pulses Ps$_1$ and Ps$_2$ of the horizontal synchronizing signal SYN. Such an unnecessary noise pulse P$_1$ which is attributable to a dropout or the like is removed in the H-rate conversion circuit 59. That is, when the time setting T1 is selected to be slightly shorter than one horizontal scanning period 1H, application of the noise pulse P$_1$ would not change the state of the output terminal Q of the flip-flop circuit 59a. Accordingly, by so arranging that the one-shot multivibrator 59b is triggered by the leading edge of the output of "high" level appearing at the output terminal Q of the flip-flop circuit 59a, the HD pulse signal generated from the output terminal Q of the multivibrator 59b is completely synchronizing with the horizontal synchronizing signal SYN without being adversely affected by the noise and includes pulses rising to their "high" level at the time interval of 1H. On the contrary, when the horizontal synchronizing signal SYN is not passed through the H-rate conversion circuit 59, the noise pulse P$_1$ will be applied to the frequency divider circuit 27 resulting in undesirable change-over of the simultaneity switch 19 at an improper position such as at a position midway of change-over between the color difference signals in the line sequential color difference signal LSS.

The flip-flop circuit 59a in the H-rate conversion circuit 59 may be replaced by a non-retriggerable one-shot multivibrator.

In the description of the operation of the embodiment shown in FIG. 4, the reset pulse generating circuit 25 generates a reset pulse when the relation (1) holds as a result of direct comparison between the sampled input voltage and the reference voltage Vref. Therefore, the relations (2) and (3) must hold.

However, the relation (1) providing the condition for generation of the reset pulse may be replaced by the following relation:

$$\text{input voltage} < Vref \tag{5}$$

In such a case, the following relations may be set:

$$\left. \begin{array}{l} Vref < Vcp \\ Vcp - V_H + V_L < Vref \end{array} \right\} \tag{6}$$

when the above relations are set, the relation between the $\overline{Q}$ output of the frequency divider circuit 27 and the kind of the color difference signal is merely inverted from the previous case. Also, even when the relative levels of the potentials in the individual horizontal blanking periods are inverted, the relation between the $\overline{Q}$ output of the frequency divider circuit 27 and the kind of the color difference signal is merely inverted.

Further, the direct comparison between the sampled voltage and the reference voltage Vref is not necessarily required. Since an amplifier or the like is usually inserted in the system, it is more frequent that a voltage or current proportional to the sampled value is compared with the reference value. Such an embodiment of the present invention will be discribed with reference to FIGS. 8 and 9. The clamping pulse CP is required to appear in the horizontal blanking period. Therefore, the clamping pulse generating circuit 30 may be arranged to be triggered in synchronism with the falling timing of the $\overline{Q}$ output of the frequency divider circuit 27. Also, the clamping pulse generating circuit 30 may be triggered in response to the Q output of the frequency divider circuit 27 in lieu of the $\overline{Q}$ output. Further, the identification signal ID may be generated from the terminal $\overline{Q}$ of the frequency divider circuit 27.

Figure 8:
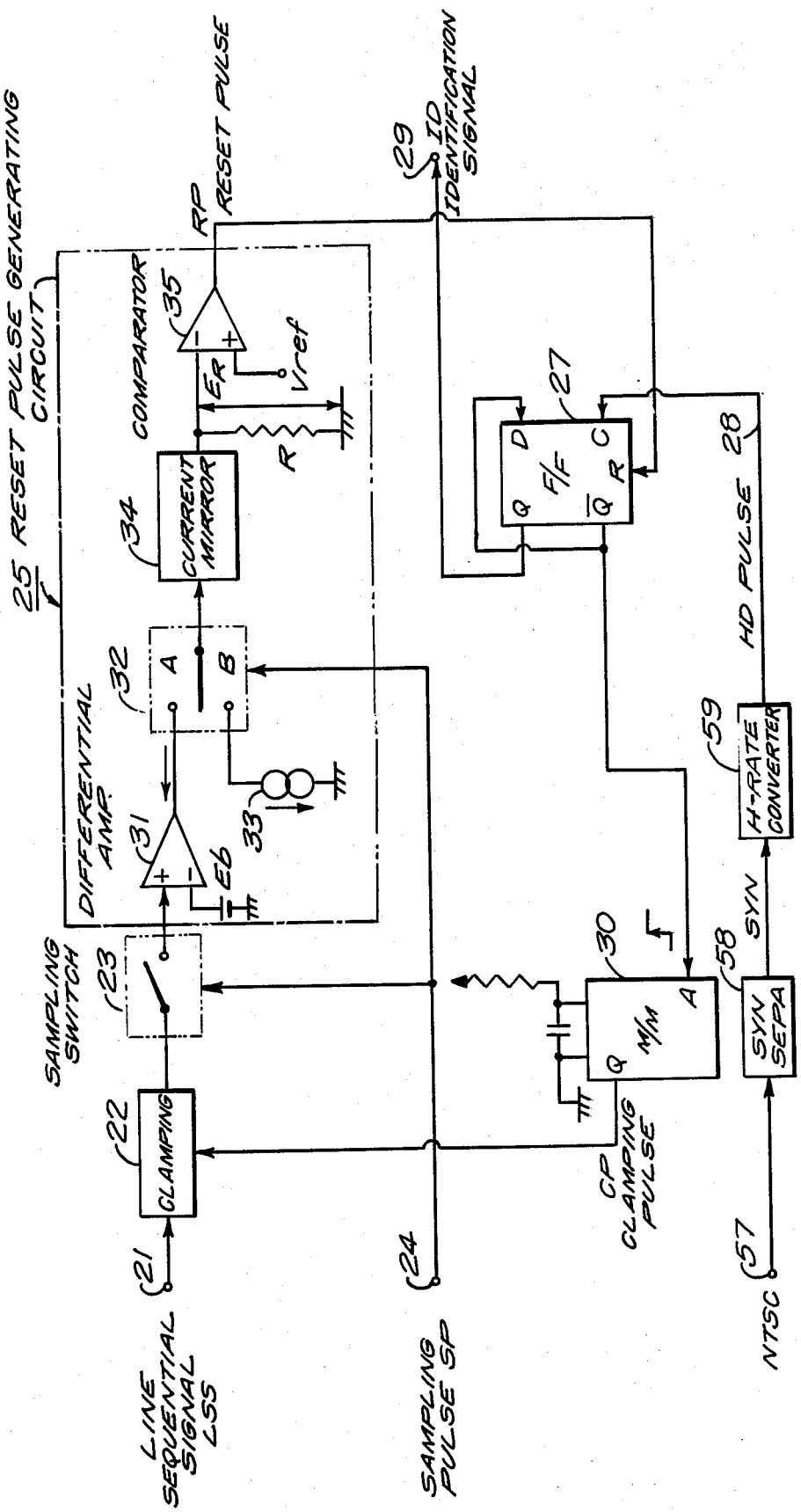
FIG. 8 is a block circuit diagram showing in detail the structure of one form of the reset pulse generation circuit shown in FIG. 4.
Figure 9:
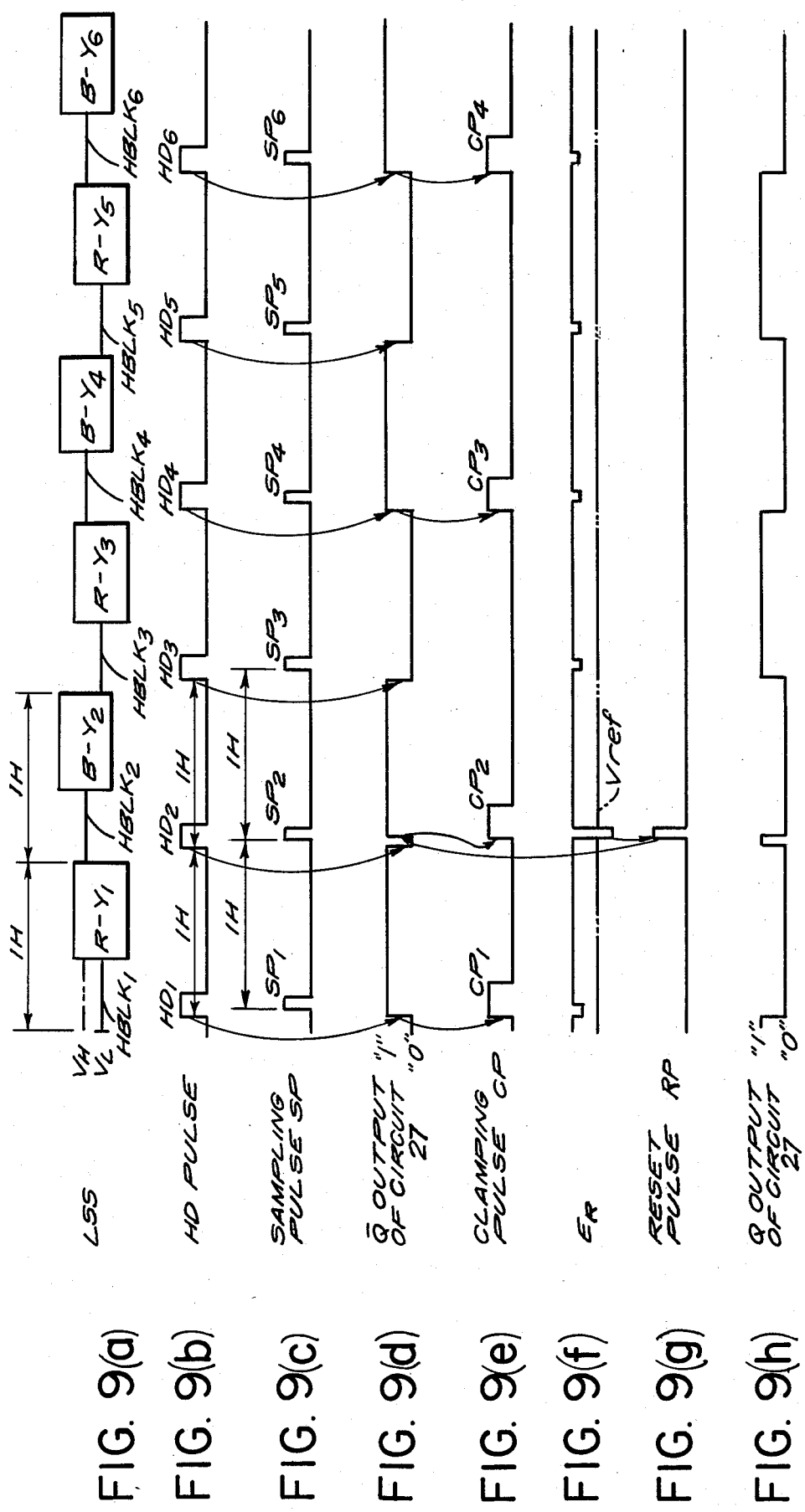
FIGS. 9(a) to 9(h) show operating waveforms appearing at various parts of the circuit shown in FIG. 8.

Referring now to FIG. 8, a differential amplifier 31, a change-over switch 32, a constant current circuit 33, a current mirror circuit 34, a comparator 35 and a current-detecting resistor R constitute the reset pulse generating circuit 25. The other elements and symbols are the same as those incorporated and used in the circuit shown in FIG. 4. The operation of the embodiment shown in FIG. 8 will be described with reference to FIGS. 9(a) to 9(h). When FIGS. 9(a) to 9(h) are compared with FIGS. 5(a) to 5(h), it is the only difference that the waveform shown in FIG. 9(f) differs from that shown in FIG. 5(f). For the sake of simplicity, FIGS. 9(a), 9(b), 9(c), 9(d), 9(e), 9(g) and 9(h) are shown to be the same as FIGS. 5(a), 5(b), 5(c), 5(d), 5(e), 5(g) and 5(h) respectively. Thus, the relation $V_H > V_L$ holds similarly, and it is supposed that the $\overline{Q}$ output of the frequency divider circuit 27 rises to its "1" level when the color difference signal R-Y$_1$ is applied to the input terminal 21. Accordingly, the potential of the color difference signal R-Y$_1$ in the first horizontal blanking period HBLK$_1$ is clamped at Vcp. The sampled signal is applied to one of the input terminals of the differential amplifier 31. The output of the differential amplifier 31 is applied to one of the contacts or the contact A of the change-over switch 32 and passes through the switch 32 to be applied to the current mirror circuit 34 during the sampling period only. The constant current circuit 33 is connected to the other contact B of the change-over switch 32 so that the constant current circuit 33 can be connected to the current mirror circuit 34 except for said sampling period. The terminal voltage E$_R$ of the resistor R connected to the output of the current mirror circuit 34 is applied to one of the input terminals of the comparator 35 to be compared with the reference voltage Vref applied to the other input terminal. The comparator 35 generates a reset pulse RP when the terminal voltage E$_R$ of the resistor R is lower than the reference voltage Vref.

The arrangement is such that a predetermined bias voltage Eb is applied to the other input terminal of the differential amplifier 31 so that, in spite of application of the sampled clamped voltage Vcp to the differential amplifier 31, the differential amplifier 31 can take out from the current mirror circuit 34 a current which is slightly smaller than or substantially equal to the current of the constant current circuit 33. Therefore, the bias voltage Eb and the reference voltage Vref are preferably so selected that the terminal voltage E$_R$ of the resistor R is not substantially reduced and is sufficiently higher than the reference voltage Vref when the potential of the color difference signal in the first horizontal blanking period HBLK$_1$ is clamped by application of a first clamping pulse CP$_1$ and then sampled by application of a first sampling pulse SP$_1$. When the voltages Eb and Vref are so selected, no reset pulse appears in the first horizontal blanking period HBLK$_1$, and, consequently, application of a second HD pulse HD$_2$ to the frequency divider circuit 27 would not produce any clamping pulse.

The bias voltage Eb and the reference voltage Vref are further so selected that the output current of the differential amplifier 31 is greatly reduced and the terminal voltage E$_R$ of the resistor R becomes sufficiently lower than the reference voltage Vref when the voltage [Vcp+(V$_H$−V$_L$)] sampled by application of a second sampling pulse SP$_2$ is applied to the differential amplifier 31 in the second horizontal blanking period HBLK$_2$. When the voltages Eb and Vref are so selected, a reset pulse RP appears at the timing of the second sampling pulse SP$_2$, and the potential in the second horizontal blanking period HBLK$_2$ is clamped. Then, when a third HD pulse HD$_3$ is applied to the frequency divider circuit 27, the $\overline{Q}$ output falls to its "low" level, and no clamping occurs. Also, since the potential in the third horizontal blanking period HBLK$_3$ is [Vcp−(V$_H$−V$_L$)], no reset pulse appears in this period. Application of a fourth HD pulse HD$_4$ to the frequency divider circuit 27 in the fourth horizontal blanking period HBLK$_4$ clamps also the potential, and no reset pulse appears similarly in this period. The same applies to the later periods, so that the Q output or $\overline{Q}$ output of the frequency divider circuit 27 can be used as the identification signal ID. The current mirror circuit 34 is incorporated for the purpose of widening the dynamic range and is fundamentally unnecessary. As in the case of the embodiment shown in FIG. 4, the HD pulse signal is provided by the output singal of the H-rate conversion circuit 59.

Figure 10:
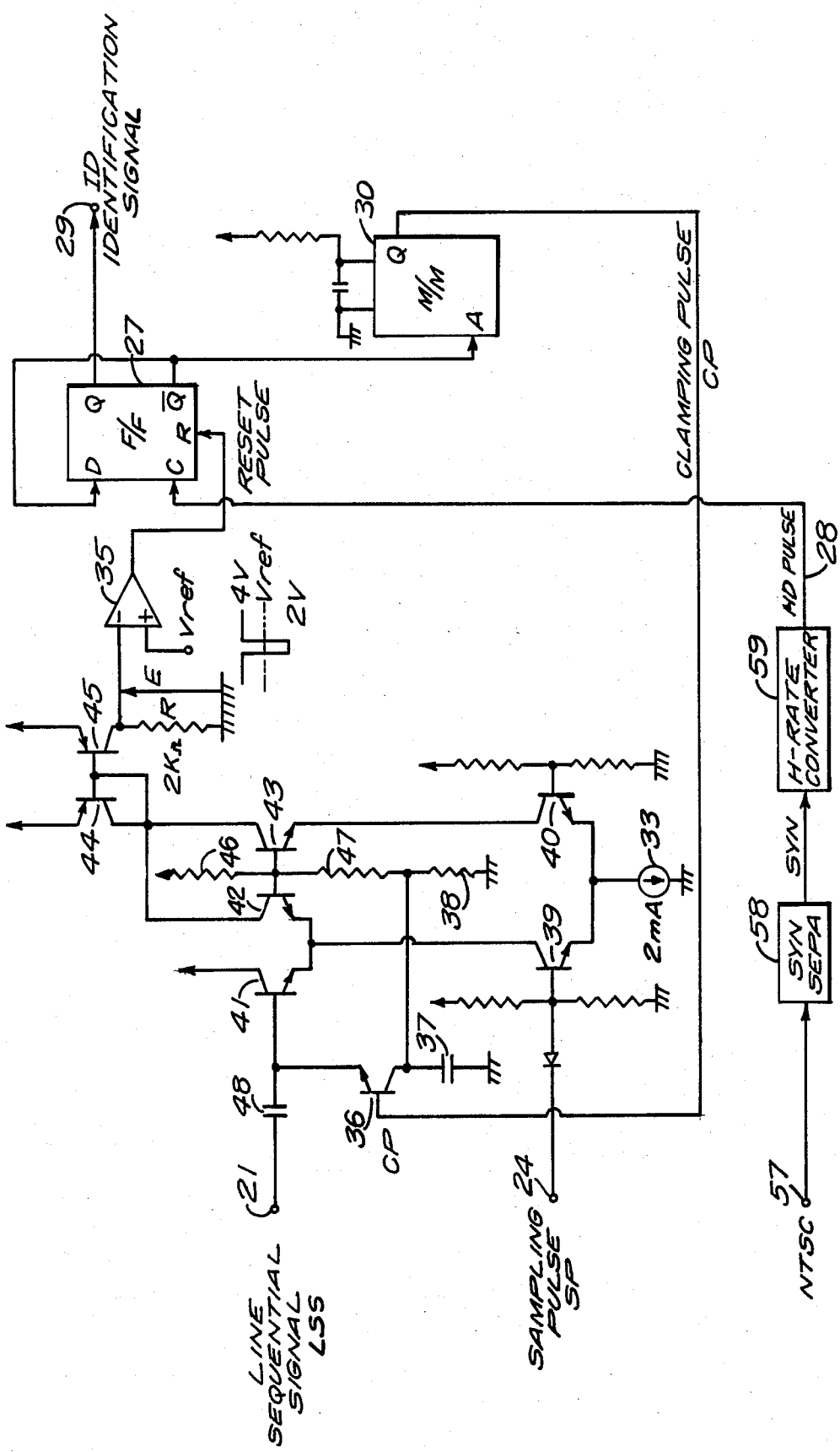
FIG. 10 is a detailed circuit diagram of the circuit shown in FIG. 8.

FIG. 10 shows in further detail the structure of the circuit shown in FIG. 8. Referring to FIG. 10, transistors 36, 41 and a capacitor 48 constitute the clamping circuit 22. A transistor 39 corresponds to the sampling switch 23, and the combination of transistors 39 and 40 turned on/off and off/on respectively corresponds to the change-over switch 32. The combination of transistors 41 and 42 constitutes the differential amplifier 31, and the combination of transistors 44 and 45 constitutes the current mirror circuit 34. Three resistors 46, 47 and 38 are provided to apply a suitable bias voltage Eb to the differential amplifier 31. As an example of numerical values, the constant current circuit 33 supplies a constant current of 2 mA, the current-detecting resistor R has a resistance value of 2 kΩ, and the terminal voltage E$_R$ of this resistor R, which is normally 4 V, drops to 2 V when the second sampling pulse SP$_2$ is applied. In FIG. 10, a capacitor 48 is provided for the purpose of DC regeneration.

Figure 11:
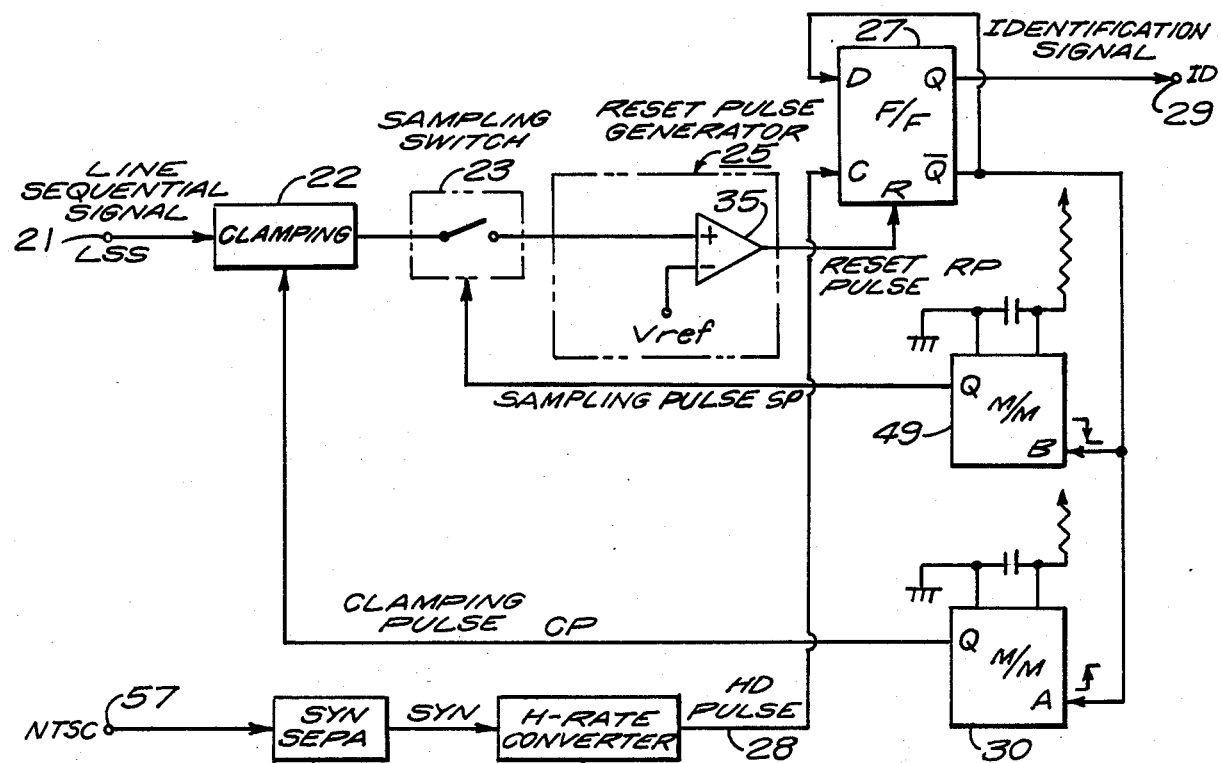
FIG. 11 is a block circuit diagram showing the structure of another embodiment of the present invention.

The sampling pulse signal SP may be generated with the timing inverse relative to the generation timing of the clamping pulse signal CP from the clamping pulse generating circuit 30. For example, when the clamping pulse signal CP is generated at the rising timing of the output signal of the frequency divider circuit 27, the sampling pulse signal SP may be generated at the falling timing of the same signal. Such an embodiment of the present invention is shown in FIG. 11. Referring to FIG. 11, the discrimination circuit includes an input terminal 21 of a line sequential color difference signal LSS, a clamping circuit 22, a sampling switch 23, a reset pulse generating circuit 25, a frequency divider circuit 27, an output terminal 29 of an identification signal ID, a clamping pulse generating circuit 30, and a sampling pulse generating circuit 49. The clamping pulse generating circuit 30 employs a monostable multivibrator triggered at the rising timing of the $\overline{Q}$ output of the frequency divider circuit 27, while the sampling pulse generating circuit 49 employs a monostable multivibrator triggered at the falling timing of the $\overline{Q}$ output of the frequency divider circuit 27. It is apparent that a monostable multivibrator triggered at the rising timing of the Q output of the frequency divider circuit 27 can be equivalently employed in the sampling pulse generating circuit 49. The pulse width of the sampling pulse SP must not be large enough to exceed the horizontal blanking period. The output of the sampling switch 23 is applied to a comparator 35 in the reset pulse generating circuit 25. In the comparator 35, the level of the output from the sampling switch 23 when turned on its merely compared with a reference voltage Vref to provide a reset pulse RP. Other portions of the circuit operation are similar to those described already with reference to FIGS. 4, 8 and 10. Especially, an H-rate conversion circuit 59 similar to that described already generates HD pulses as its output signal. FIGS. 12(a) to 12(h) show operating waveforms appearing at various parts of FIG. 11.

In each of the embodiments described with reference to FIGS. 4, 8, 10 and 11, the potential in the horizontal blanking period immediately after the horizontal blanking period in which the potential is first clamped is directly or indirectly compared with a reference value for discriminating the kind of the color difference signal. This method has such an advantage that clamping of the potential in the horizontal blanking period immediately before the discrimination of the kind of the color difference signal can effect quite accurate discrimination of the color difference signal independently of its picture pattern. It is needless to mention that any substantial delay of the discrimination of the kind of the color difference signal would not accur when compared to the method using bandpass filters and discriminating the color difference signal on the basis of the frequency difference, since the potential in the horizontal blanking period is utilized for discrimination.

Figure 13:
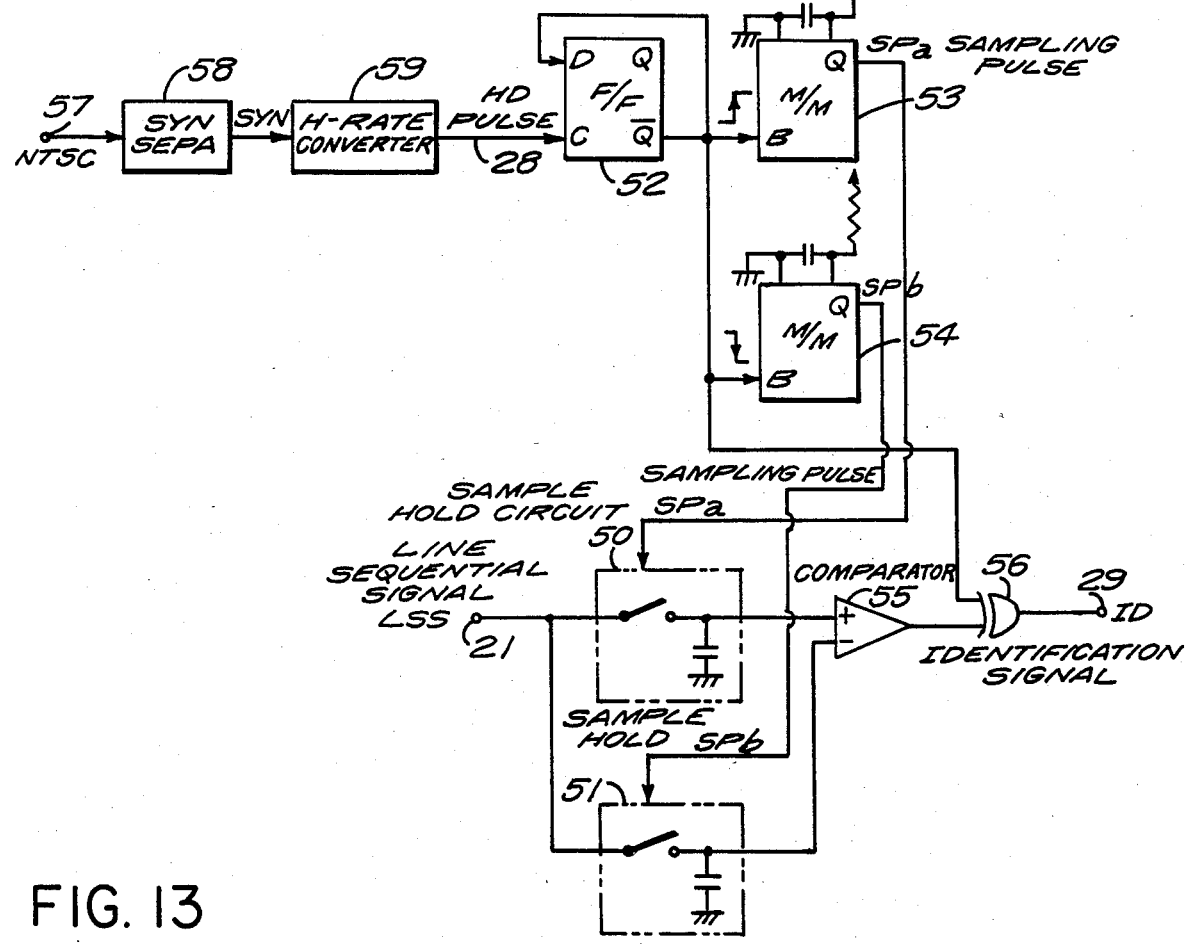
FIG. 13 is a block circuit diagram showing the structure of still another embodiment of the present invention.

Another embodiment of the present invention in which the kind of a color difference signal is discriminated without resorting to the potential clamping will be described with reference to FIGS. 13, 14(a) to 14(e) and 15(a) to 15(e). Referring to FIG. 13 showing the structure of the line-sequential color difference signal discrimination circuit embodying this aspect of the present invention, the discrimination circuit includes an input terminal 21 of a line sequential color difference signal LSS, two sample-hold circuits 50, 51, a frequency divider circuit 52 dividing the frequency of its input pulse signal by the factor of 2, two sampling pulse generating circuits 53, 54, a comparator circuit 55, and an Ex-OR gate 56. Each of the two sample-hold circuits 50 and 51 has a holding time of 2H. The frequency divider circuit 52 need not have any reset function and acts to merely divide the frequency of its input by the factor of 2. The two sampling pulse generating circuits 53 and 54 generate sampling pulses SPa and SPb alternately at a time interval of 1H in individual horizontal blanking periods respectively. In FIG. 13, these circuits 53 and 54 include monostable multivibrators connected to the output terminal $\overline{Q}$ of the frequency divider circuit 52 to be triggered respectively by the leading and trailing edges respectively of the $\overline{Q}$ output of the frequency divider circuit 52.

Suppose now that the line sequential color difference signal LSS and the $\overline{Q}$ output of the frequency divider circuit 52 have a relation as shown in FIGS. 14(a) and 14(b). Then, the two sampling pulses SPa and SPb are generated in relation to the line sequential color difference signal LSS as shown in FIGS. 14(c) and 14(d) respectively. Suppose further that the potential $V_L$ of the color difference signal R-Y is lower than the potential $V_H$ of the color difference signal B-Y. Then, according to the above manner of sampling, the lower voltage of the color difference signal R-Y and the higher voltage of the color difference signal B-Y are always applied to the plus and minus input terminals respectively of the comparator circuit 55, and the output of the comparator circuit 55 is normally in its "0" level. Therefore, an output signal as shown in FIG. 14(e) appears from the Ex-OR gate 56 to which the output of the comparator circuit 55 and the $\overline{Q}$ output of the frequency divider circuit 52 are applied as its inputs.

On the other hand, suppose now that the relation between the line sequential color difference signal LSS and the $\overline{Q}$ output of the frequency divider circuit 52 shown in FIGS. 14(a) and 14(b) respectively is inverted to provide a relation as shown in FIGS. 15(a) and 15(b). In this case, the relation between the two sampling pulses SPa and SPb generated in relation to the line sequential color difference signal LSS is also inverted as shown in FIGS. 15(c) and 15(d). Therefore, the output of the comparator circuit 55 is normally in its "1" level. However an output signal as shown in FIG. 15(e) appears from the Ex-OR gate 56 to which the output of the comparator circuit 55 and the $\overline{Q}$ output of the frequency divider circuit 52 are applied as its inputs. Thus, the same signal appears from the Ex-OR gate 56 in both cases of FIG. 14(b) and FIG. 15(b). Therefore, the output of the Ex-OR gate 56 can be used as the identification signal ID. The same applies to the case where the Q output, instead of the $\overline{Q}$ output, of the frequency divider circuit 52 is applied to the Ex-OR gate 56 or also to the sampling pulse generating circuits 53 and 54.

In the embodiment shown in FIG. 13 too, the output signal of an H-rate conversion circuit 59 provides the HD pulse signal as in the case of the embodiment shown in FIG. 4.

It will be understood from the foregoing detailed description of the present invention that the identification signal is produced on the basis of the difference between the potentials in the adjacent horizontal blanking periods of a demodulated line sequential color difference signal. Therefore, a delay, if any, of the discrimination timing can be substantially ignored when compared to the SECAM system using narrow-bandpass filters, and the color signals can be accurately discriminated without delay. Further, by virtue of the provision of the horizontal scanning period rate conversion circuit (the H-rate conversion circuit) in the present invention, a pulse signal which is synchronous with the horizontal synchronizing signal and includes pulses appearing accurately at the time interval of one horizontal scanning period is based on for effecting the desired accurate discrimination, so that the discrimination can be reliably effected at the desired position. That is, the discriminating operation can be effected at the predetermined position since, even when, an unnecessary pulse attributable to, for example, dropout or noise may appear between the pulses of the horizontal synchronizing signal, the adverse effect of such a pulse can be easily removed.

I claim:

1. A line-sequential color signal discrimination circuit which receives as its input signal a line sequential color signal provided by alternately selecting two kinds of color signals at a time interval of one horizontal scanning period to arrange the color signals in a line sequential fashion and modulated in such a relation that the two kinds of the color signals have respectively different potentials in the adjacent horizontal blanking periods after demodulation and which generates as its output signal an identification signal discriminating between the two kinds of the color signals, said discrimination circuit comprising: a frequency divider circuit receiving as its input signal a pulse signal including HD pulses applied at a time interval of one horizontal scanning period and dividing the frequency of said HD pulse signal by the factor of 2, said frequency divider circuit having a reset terminal; a clamping pulse generating circuit triggered in synchronous relation with the timing of the rise time or fall time of the output signal of said frequency divider circuit thereby generating a clamping pulse signal including pulses selectively appearing in the horizontal blanking periods; a clamping circuit clamping the demodulated line sequential color signal at a predetermined potential; a sampling circuit sampling the clamped and demodulated line sequential color signal in at least the horizontal blanking period immediately after the signal-clamping horizontal blanking period among the individual horizontal blanking periods; and a reset pulse generating circuit comparing each of succesively sampled values with a reference value and generating a reset pulse resetting the frequency divider circuit when a predetermined condition of whether the sampled value is larger or smaller than the reference value is satisfied, whereby said identification signal is generated from said frequency divider circuit.

2. A discrimination circuit as claimed in claim 1, wherein said reset pulse generating circuit includes a differential amplifier making differential amplification of the output signal of said sampling circuit and a signal of a first predetermined level, a switching means alternately selecting the output signal of said differential amplifier and a signal of a second predetermined level at timing conciciding with the timing of a sampling pulse signal applied to said sampling circuit, and a comparator circuit comparing the output signal of said switching means or a signal proportional to said switching means output signal with said reference value.

3. A discrimination circuit as claimed in claim 1, wherein said sampling circuit includes a sampling switch, and a sampling pulse generating circuit triggered in synchronism with the timing at which said clamping pulse generating circuit, triggered at the timing of the rise time or fall time of the output signal of said frequency divider circuit, is not triggered and generating a pulse actuating said sampling switch in the horizontal blanking period immediately after said signal-clamping horizontal blanking period, and said reset pulse generating circuit includes a comparator circuit comparing the sampled value sampled in the sampling pulse period with said reference value.

4. A line-sequential color signal discrimination circuit which receives as its input signal a line sequential color signal provided by alternately selecting two kinds of color signals at a time interval of one horizontal scanning period to arrange the color signals in a line sequential fashion and modulated in such a relation that the two kinds of the color signals have respectively different potentials in the adjacent horizontal blanking periods after demodulation and which generates as its output signal an identification signal discriminating between the two kinds of the color signals, said discrimination circuit comprising: two sample-hold circuits receiving the demodulated line sequential color signal as their input signals; a comparator circuit comparing the relative levels of the output signals of said two sample-hold circuits with each other; a frequency divider circuit receiving as its input signal a pulse signal including HD pulses applied at a time interval of one horizontal scanning period and dividing the frequency of said HD pulse signal by the factor of 2; a first sampling pulse generating circuit triggered in synchronous relation with the timing of the rise time or fall time of the output signal of said frequency divider circuit thereby generating a sampling pulse actuating one of said sample-hold circuits in the horizontal blanking periods; a second sampling pulse generating circuit triggered in synchronous relation with the timing at which said first sampling pulse generating circuit, triggered at the timing of the rise time or fall time of the output signal of said frequency divider circuit, is not triggered thereby generating a sampling pulse actuating the other of said sample-hold circuits in the horizontal blanking period; and an Ex-OR gate generating said identification signal in response to the application of the output signal of said frequency divider circuit and the output signal of said comparator circuit.

5. A line-sequential color signal discrimination circuit which receives as its input signal a line sequential color signal provided by alternately selecting two kinds of color signals at a time interval of one horizontal scanning period to arrange the color signals in a line sequential fashion and modulated in such a relation that the two kinds of the color signals have respectively different potentials in the adjacent horizontal blanking periods after demodulation and which generates as its output signal an identification pulse signal discriminating between the two kinds of the color signals, said discrimination circuit comprising: a horizontal synchronizing signal separating circuit separating the horizontal synchronizing signal from a composite video signal; a horizontal scanning period rate conversion circuit extracting a pulse signal including pulses appearing at a time interval of one horizontal scanning period in response to the application of the output pulse signal from said synchronizing signal separating circuit; a frequency divider circuit dividing the frequency of the output pulse signal of said horizontal scanning period rate conversion circuit by the factor of 2; and an identification pulse generating circuit generating said identification pulse signal in which the information for discrimination based on the potentials of the two kinds of the color signals in the demodulated line sequential color signal in the horizontal blanking periods has a predetermined relation with the output signal of said frequency divider circuit.

6. A line-sequential color signal discrimination circuit which receives as its input signal a line sequential color signal provided by alternately selecting two kinds of color signals at a time interval of one horizontal scanning period to arrange the color signals in a line sequential fashion and modulated in such a relation that the two kinds of the color signals have respectively different potentials in the adjacent horizontal blanking periods after demodulation and which generates as its output signal an identification signal discriminating between the two kinds of the color signals, said discrimination circuit comprising: a synchronizing signal separating circuit separating the horizontal synchronizing signal from a composite video signal; a horizontal scanning period rate conversion circuit extracting a pulse signal including pulses appearing at a time interval of one horizontal scanning period in response to the application of the output pulse signal from said snchronizing signal separating circuit; a frequency divider circuit dividing the frequency of the output pulse signal of said horizontal scanning period rate conversion circuit by the factor of 2 and having a reset terminal; a clamping pulse generating circuit triggered in synchronous relation with the timing of the rise time or fall time of the output signal of said frequency divider circuit thereby generating a clamping pulse signal including pulses selectively appearing in the horizontal blanking periods; a clamping circuit clamping the demodulated line sequential color signal at a predetermined potential; a sampling circuit sampling the clamped line sequential color signal in at least the horizontal blanking period immediately after the signal-clamping horizontal blanking period among the individual horizontal blanking periods; and a reset pulse generating circuit comparing each of successively sampled values with a reference value and generating a reset pulse resetting said frequency divider circuit when a predetermined condition of whether the sampled value is larger or smaller than the reference value is satisfied, whereby said identification signal is generated from the frequency divider circuit.

7. A discrimination circuit as claimed in claim 6, wherein said reset pulse generating circuit includes a differential amplifier making differential amplification of the output signal of said sampling circuit and a signal of a first predetermined level, a switching means alternately selecting the output signal of said differential amplifier and a signal of a second predetermined level at timing coinciding with the timing of a sampling pulse signal applied to said sampling circuit, and a comparator circuit comparing the output signal of said switching means or a signal proportional to said switching means output signal with said reference value.

8. A discrimination circuit as claimed in claim 6, wherein said sampling circuit includes a sampling switch, and a sampling pulse generating circuit triggered in synchronism with the timing at which said clamping pulse generating circuit, triggered at the timing of the rise time or fall time of the output signal of said frequency divider circuit, is not triggered and generating a pulse actuating said sampling switch in the horizontal blanking period immediately after said signal-clamping horizontal blanking period, and said reset pulse generating circuit includes a comparator circuit comparing the sampled value sampled in the sampling pulse period with said reference value.

9. A line-sequential color signal discrimination circuit which receives as its input signal a line sequential color signal provided by alternately selecting two kinds of color signals at a time interval of one horizontal scanning period to arrange the color signals in a line sequential fashion and modulated in such a relation that the two kinds of the color signals have respectively different potentials in the adjacent horizontal blanking periods after demodulation and which generates as its output signal an identification signal discriminating between the two kinds of the color signals, said discrimination circuit comprising: two sample-hold circuits receiving the demodulated line sequential color signal as their input signals; a comparator circuit comparing the relative levels of the output signals of said two sample-hold circuits with each other; a frequency divider circuit receiving as its input signal a pulse signal including HD pulses applied at a time interval of one horizontal scanning period and dividing the frequency of said HD pulse signal by the factor of 2; a synchronizing signal separating circuit separating the horizontal synchronizing signal from a composite video signal; a horizontal scanning period rate conversion circuit extracting a pulse signal including pulses appearing at a time interval of one horizontal scanning period in response to the application of the output signal from said synchronizing signal separating circuit; a first sampling pulse generating circuit triggered in synchronous relation with the timing of the rise time or fall time of the output signal of said frequency divider circuit thereby generating a pulse actuating one of said sample-hold circuits in the horizontal blanking periods; a second sampling pulse generating circuit triggered in synchronous relation with the timing at which said first sampling pulse generating circuit, triggered at the timing of the rise time or fall time of the output signal of said frequency divider circuit, is not triggered thereby generating a sampling pulse actuating the other of said sample-hold circuits in the horizontal blanking period; and an Ex-OR gate generating said identification signal in response to the application of the output signal of said frequency divider circuit and the output signal of said comparator circuit.

* * * * *